Aug. 2, 1960  W. G. FROEDE  2,947,290
HEAT GENERATING ROTARY INTERNAL COMBUSTION ENGINE
Filed Nov. 18, 1958  12 Sheets-Sheet 1

Inventor
W. G. Froede

Inventor
W. G. Froede

Inventor
W. G. Froede

Aug. 2, 1960 W. G. FROEDE 2,947,290
HEAT GENERATING ROTARY INTERNAL COMBUSTION ENGINE
Filed Nov. 18, 1958 12 Sheets-Sheet 7

Inventor
W. G. Froede
By *[signature]*
Attys.

Aug. 2, 1960  W. G. FROEDE  2,947,290
HEAT GENERATING ROTARY INTERNAL COMBUSTION ENGINE
Filed Nov. 18, 1958  12 Sheets-Sheet 10

FIG.50

INVENTOR
WALTER G. FROEDE

ATTORNEYS

United States Patent Office 2,947,290
Patented Aug. 2, 1960

2,947,290
HEAT GENERATING ROTARY INTERNAL COMBUSTION ENGINE

Walter G. Froede, Neckarsulm, Germany, assignor to NSU Werke Aktiengesellschaft, Neckarsulm, Germany, and Wankel G.m.b.H., Lindau, Bodensee, Germany Filed Nov. 18, 1958, Ser. No. 774,721

Claims priority, application Germany Nov. 18, 1957

12 Claims. (Cl. 123—8)

The present invention relates to the art of rotary mechanisms.

More particularly, this invention relates to rotary mechanisms of the type which includes an outer body or component having a peripheral inner surface shaped to provide a plurality of circumferentially spaced, symmetrically arranged, lobe-defining portions and an inner body having a peripheral outer surface shaped to provide a plurality of circumferentially spaced, symmetrically arranged, apex portions with the number of apex portions being $n+1$ where $n$ denotes the number of lobe-defining portions. Further the bodies are mounted such that the inner one has its axis parallel with and eccentric of the axis of the outer body. Rotary mechanisms of this type are clearly set forth in an application filed in the names of Felix Wankel and Ernst Höppner Ser. No. 646,752, dated March 18, 1957, now abandoned, and a continuation in part application Serial No. 774,517, filed November 17, 1958.

As set forth in these two applications the working cycle of the mechanism when it is constructed as an internal combustion engine is either a 4-cycle operation or a modified 4-cycle where the number of apex portions is for example 4. The process of gas change in such engines is controlled solely by the relative movement of the inner body with respect to the outer body. Thus both bodies can be rotors, in which case they both rotate in the same direction with the speed ratio of outer body to inner body being equal to $$\frac{n+1}{n}$$

where $n$ denotes the number of lobe-defining portions on the inner periphery of the outer body. Alternatively, the outer body can be a stationary housing, the inner body is journalled on an eccentric and performs a planetary movement within the outer body. In this form of mechanism which is a kinematic inversion of the arrangement in which both bodies are rotors, the gas change process is again solely determined by the relative movement of the inner body with respect to the stationary outer body, there being suitably positioned fuel inlet channel means or port means and exhaust port means associated with the outer body. As set forth in said prior applications the working cycle of engines of this type can be either a 4-cycle operation which comprises fuel intake, compression, working and exhaust cycles or certain modifications of a 4-cycle operation which are applicable to engines constructed such that the inner body has more than three apex portions thus defining more than three variable volume working chambers during relative turning movement of the bodies. In one example where the outer body has an internal shape in the form of a 3-arched epitrochoid and the inner body is generally square in appearance and has four apex means, the working cycle can be modified to provide for prolonged expansion or it can be modified by providing additional port means for inserting an air intake and air exhaust cycle between each main exhaust cycle and the next intake cycle. Thus in the latter instance there is a 6-cycle operation. The present invention while relating to engines of the character just described is applicable to those in which the inner body has at least four apex portions and has for a principal object to modify the working cycle by the provision of port means so located with respect to the intake and exhaust ports provided for in an ordinary 4-cycle operation as to permit the engine to function as a heat generator. In other words this invention provides for the provision of additional port means associated with at least one end wall of the outer body at a location relative to the phase position of the inner body with respect to the outer body such that the major portion of gases of high temperature and pressure that exist at the end of the working stroke are discharged through the additional port means for use as a heat and pressure medium.

It is a more particular object of this invention to provide in combination with an engine of the type described provided with such additional port means, a compressor structure correlated with and driven by the engine and including an outlet duct that communicates with the space between the bodies at a location directly opposite said additional port means.

It is a further object of the invention to provide a combined rotary engine and compressor structure in which an additional exhaust duct communicates with the space between the bodies and the outlet from the compressor is directed into the hot pressurized gases leaving such exhaust duct at a location adjacent the outlet from the engine.

In connection with this invention it is known that gases under high pressure and high temperature are utilized in expansion machines such as a gas turbine. In operating gas turbines it is important that the gases have as high a pressure and temperature as possible and normally mechanisms known as heat generators are associated with such turbines. An internal combustion engine having a reciprocating free piston combined with a reciprocating piston type compressor has proved useful in this regard. However, a heat generator of this type is not only of large and cumbersome structure but it also possesses a further disadvantage of having a low frequency of strokes. Accordingly, this invention has for an object to provide a heat generator mechanism in the form of the afore-described rotary internal combustion engine and one which has a small light-weight construction and high efficiency. Further the rotary engine will operate on what can be termed a 6-cycle operation comprising an intake phase where fuel-air mixture enters the space between the outer and inner bodies, a compression phase wherein the working chamber with the fuel therein is subjected to compression when the volume is diminished, an expansion or working phase wherein the gases are ignited and the working chamber increases in volume, and thus the gases are under high pressure and temperature, next an exhaust phase for such gases followed by a re-expansion phase wherein any residual gases under high pressure are allowed to expand so that the pressure and temperature thereof diminishes following which the re-expanded residual gases are exhausted. Preferably the present invention provides a combined engine and heat generator in which the inner face of the outer body is in the form of a 3- or 6-lobed epitrochoid or of an outer parallel curve thereto while the rotor is shaped as an approximation of the inner envelope of the epitrochoid. Where the expansion machine that is to be fed with gases from the engine of this invention is such that the temperature of the pressurized exhaust gases is too high, this invention combines with such exhaust gases compressed air and a further object of the invention is to provide a unitary compact, combined rotary engine and rotary compressor which includes a common support housing.

Further and more specific objects of the invention will be apparent from the following description in connection with the accompanying drawings in which.

Figure 49:
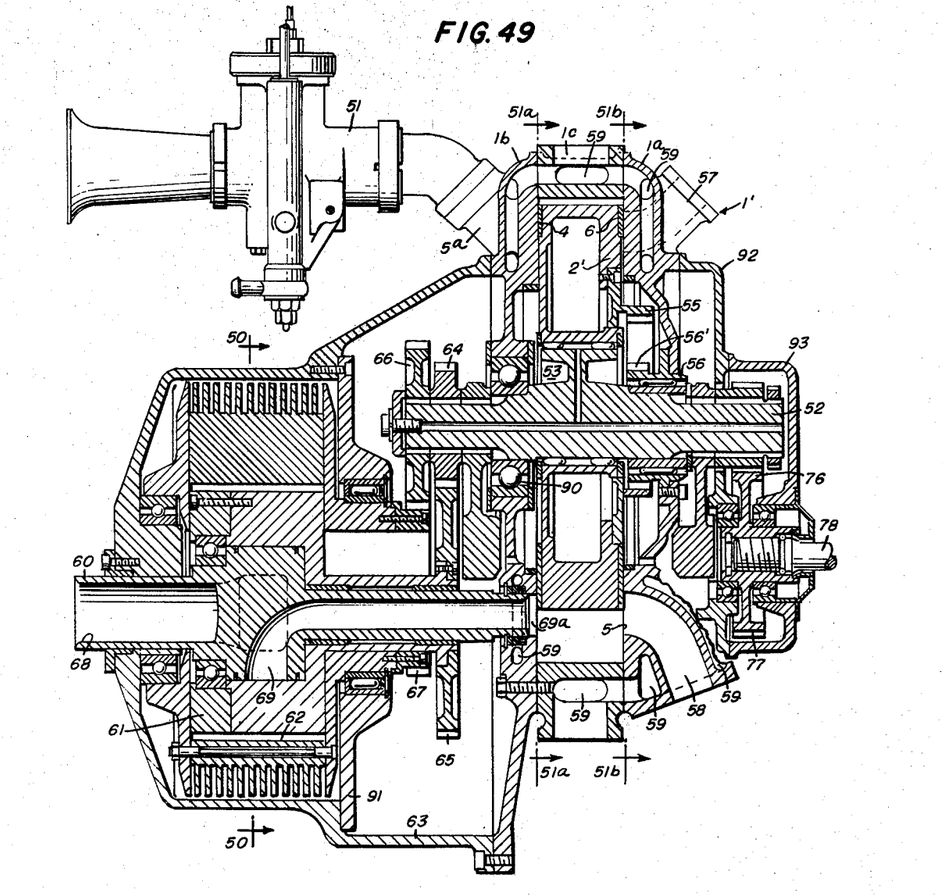
Figure 49 is a longitudinal sectional view on line 49—49 of Figure 51, illustrating a rotary engine operating in accordance with the phase relationship in the immediately afore-described figures combined with a compressor for drawing in ambient air, compressing the same and discharging it directly into the interior of the engine.
Figure 50:
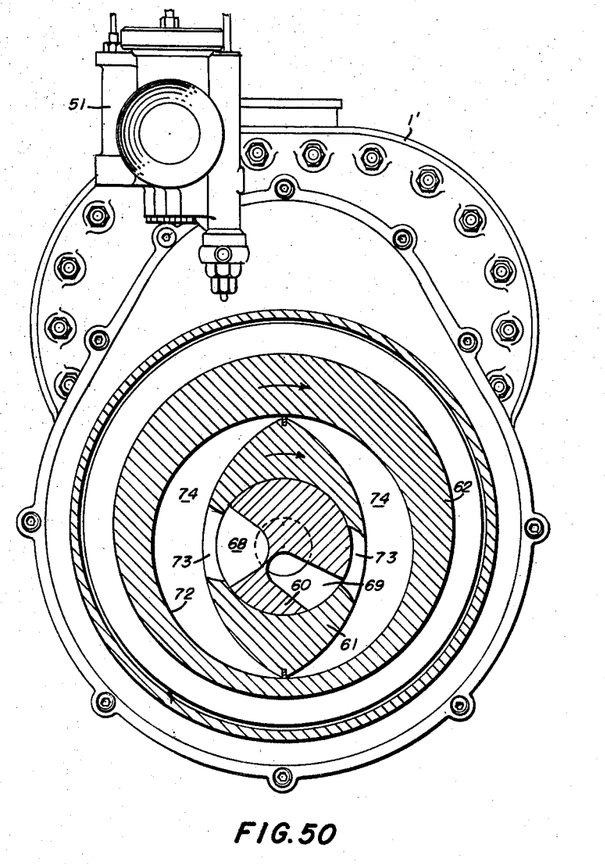
Figure 50 is a view partly in end elevation and partly in cross section on line 50—50 of Figure 49 and illustrating the interior of the working chamber of the compressor.
Figure 51:
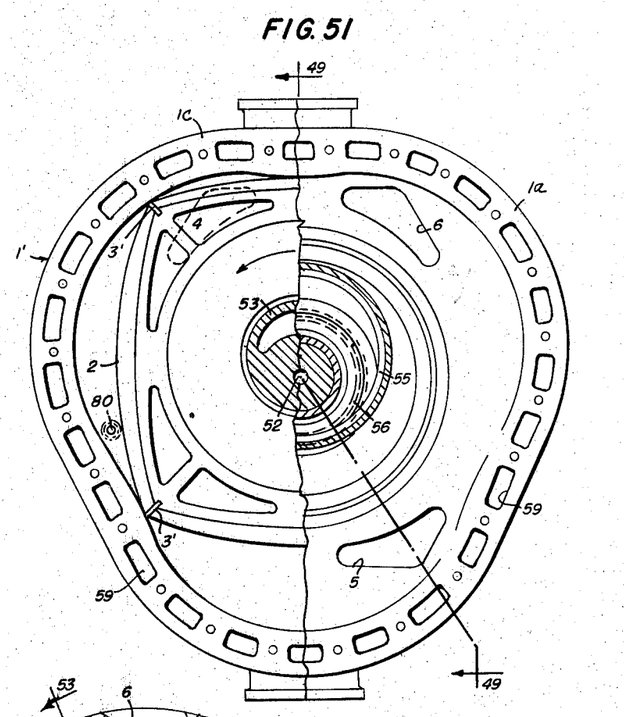
Figure 51 is a combination view illustrating on the left hand side the structure of the engine as viewed along line 51a—51a of Figure 49, and on the right hand side the same structure with the inner component and its supporting shaft removed, as viewed along line 51b—51b of Figure 49.

The diagrammatic illustrations in Figures 1 to 48 clearly disclose the several phases of the working cycle of an engine in which the outer body 1 is in the form of a stationary housing and has its inner peripheral surface shaped as a 3-lobed or arched epitrochoid. Within the outer body as explained hereinafter with reference to Figures 49 to 51 is mounted a rotor 2. This rotor 2 is journalled on an eccentric 53′ and the center or axis of the rotor $M_2$ is parallel to the axis $M_1$ of the shaft 52′ carrying the eccentric and which axis $M_1$ is likewise the geometrical center of the epitrochoidal contour.

Figure 1:
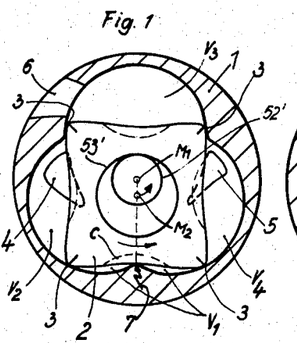
Figures 1 to 48 are diagrammatic views illustrating the phase relationship between the outer and inner components of the rotary engine in which the outer component is stationary, has three lobes on its inner periphery and the rotor has 4 apex portions.
Figure 2:
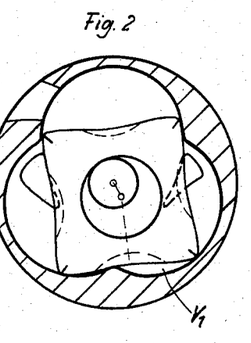
Figure 3:
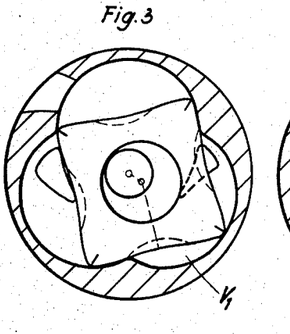
Figure 4:
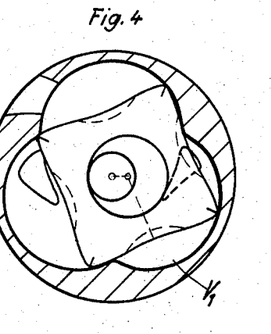
Figure 5:
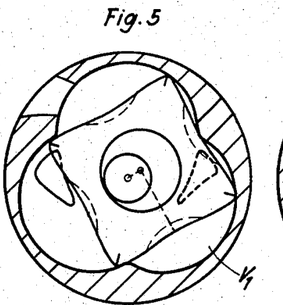
Figure 6:
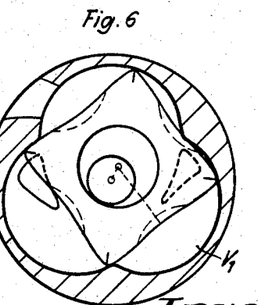
Figure 7:
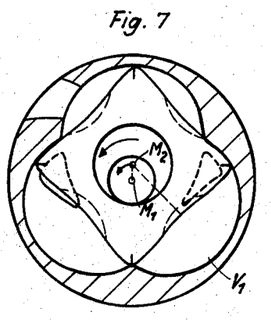
Figure 8:
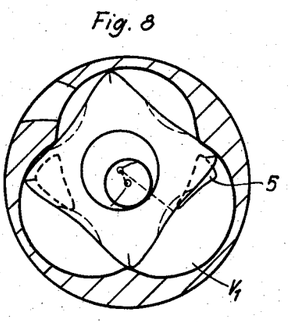
Figure 9:
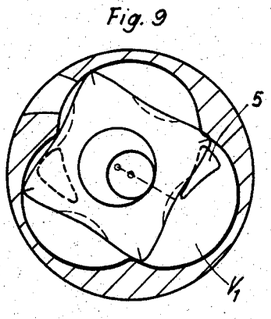
Figure 10:
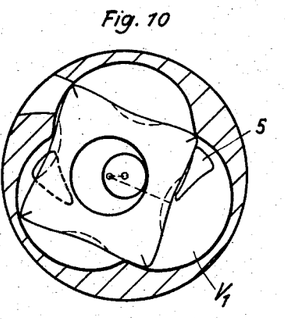
Figure 11:
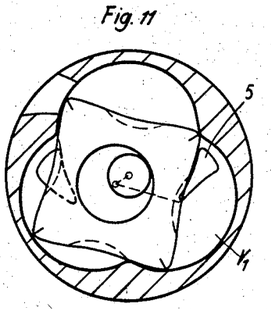
Figure 12:
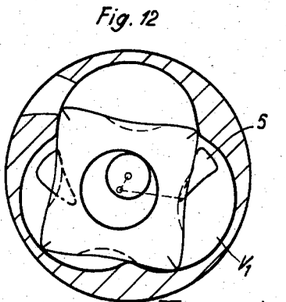
Figure 13:
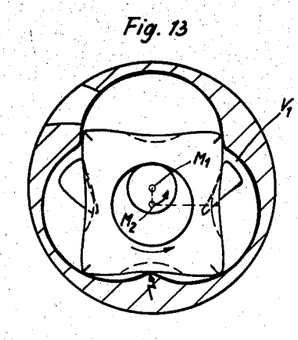
Figure 14:
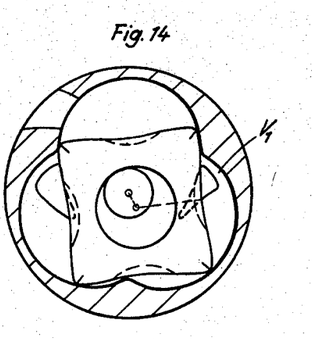
Figure 15:
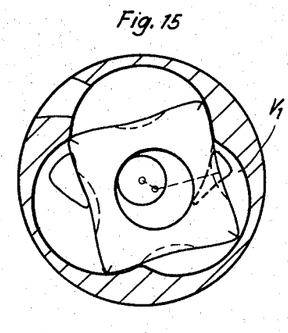
Figure 16:
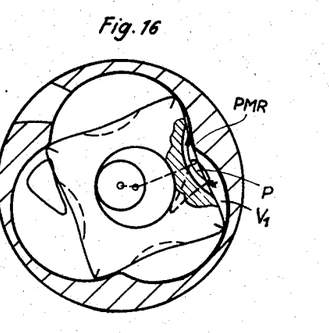
Figure 17:
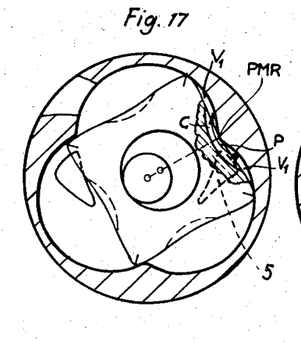
Figure 18:
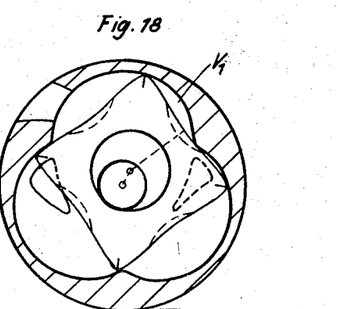
Figure 19:
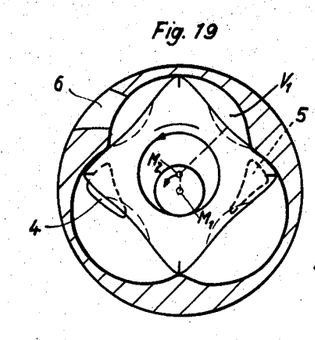
Figure 20:
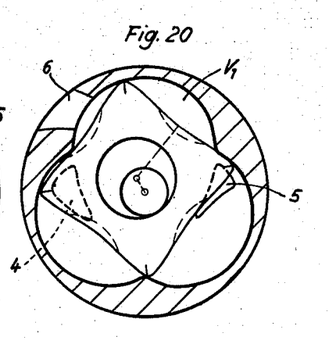
Figure 21:
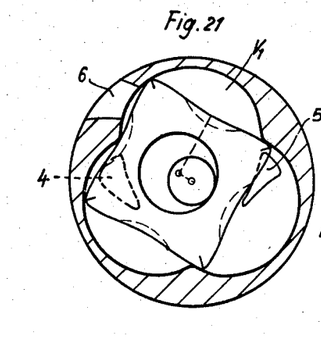
Figure 22:
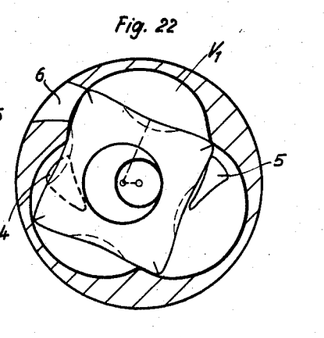
Figure 23:
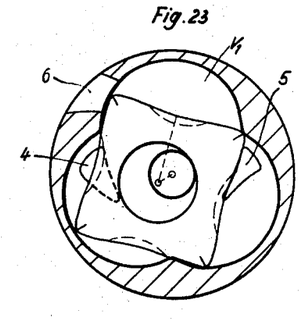
Figure 24:
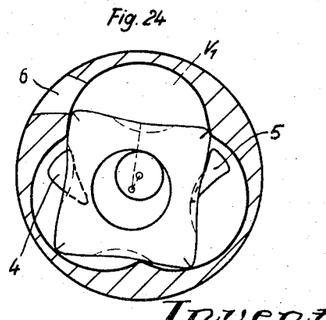
Figure 25:
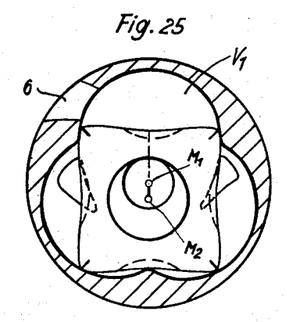
Figure 26:
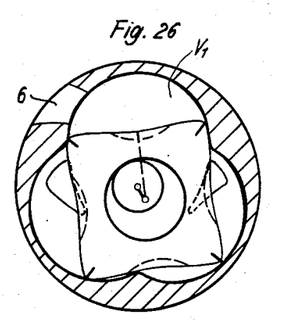
Figure 27:
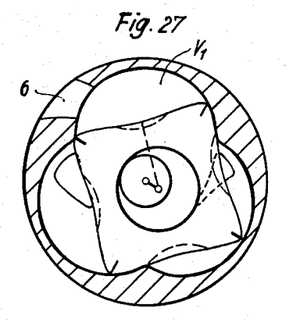
Figure 28:
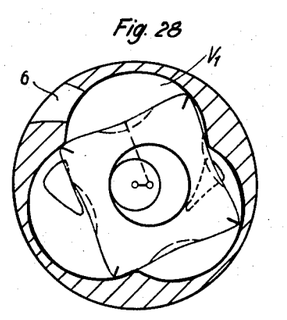
Figure 29:
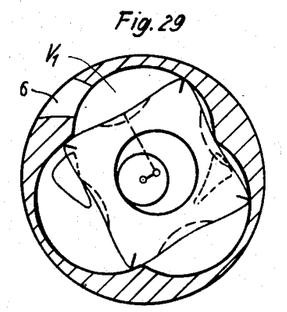
Figure 30:
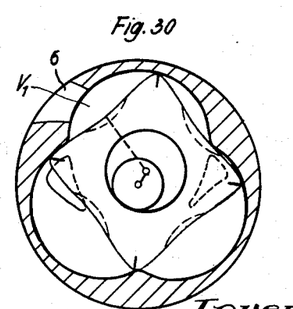
Figure 31:
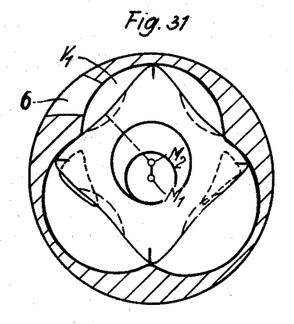
Figure 32:
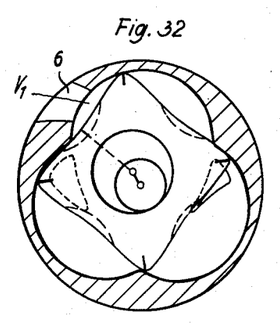
Figure 33:
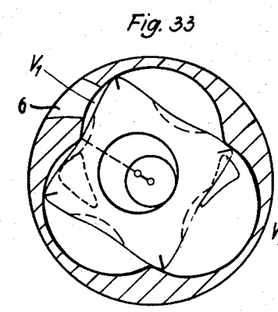
Figure 34:
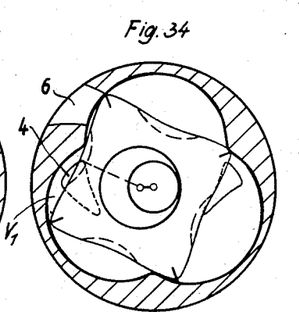
Figure 35:
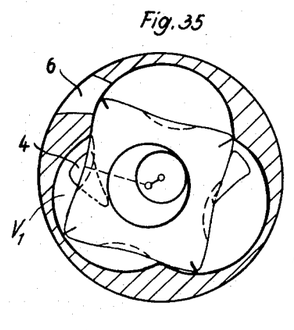
Figure 36:
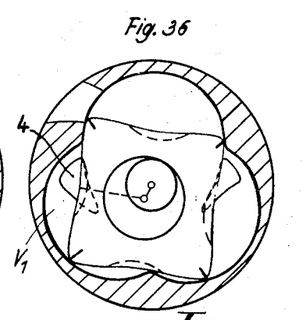
Figure 37:
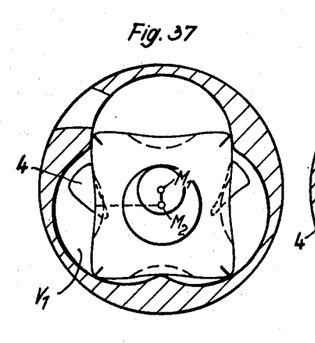
Figure 38:
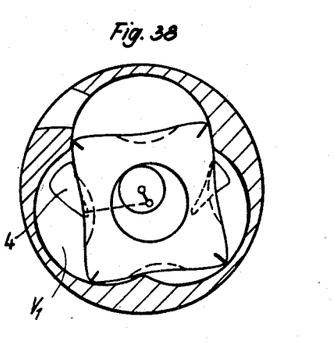
Figure 39:
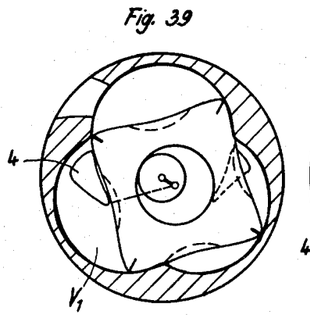
Figure 40:
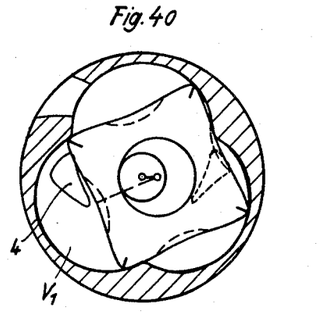
Figure 41:
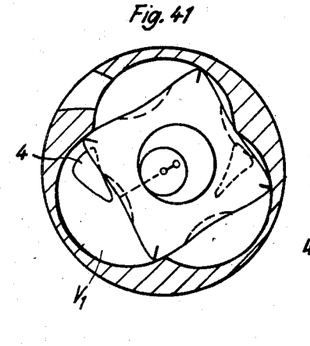
Figure 42:
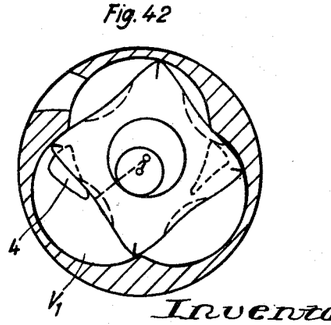
Figure 43:
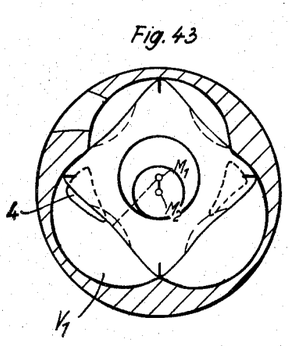
Figure 44:
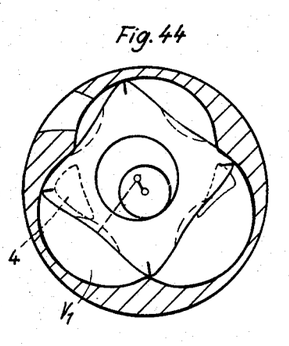
Figure 45:
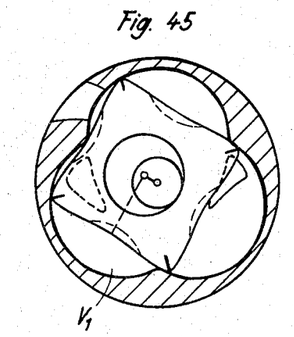
Figure 46:
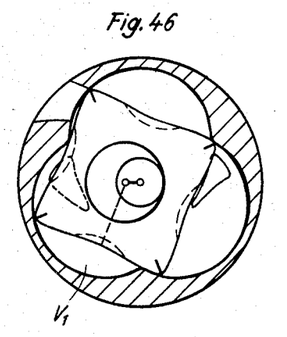
Figure 47:
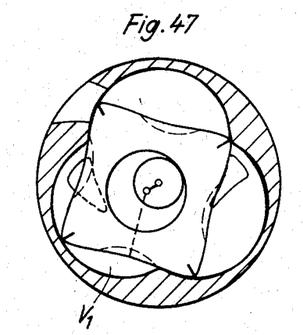
Figure 48:
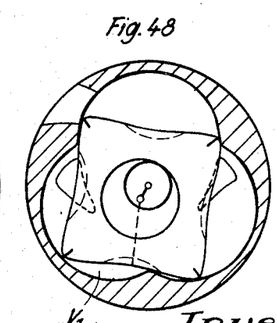

As clearly explained in said above mentioned two prior applications, the rotor 2 performs a planetary movement in the direction of the arrow and due to the co-operation between the number of apex portions and the number of lobes, the relation of rotation is such that upon four revolutions of the eccentric around its axis $M_1$, the rotor 2 performs one revolution around its axis $M_2$. Between the inner contour of the body or housing 1 and the outer contour of the rotor 2 are defined upon relative turning movement four variable volume working chambers $V_1$, $V_2$, $V_3$ and $V_4$. The edges of the inner body lying in a longitudinal plane passing radially through each apex portion accommodate sealing elements denoted diagrammatically at 3 which can be of the type set forth in prior filed applications Ser. No. 654,840 entitled "Seals for Working Spaces of Rotary Piston Engines," dated April 24, 1957, now Patent No. 2,880,045, and Ser. No. 761,339 entitled "Rotary Mechanisms," dated September 16, 1958. Thus the sealing elements are in continuous sealing engagement with the inner trochoidal contour of the housing. The inlet port for the fuel-air mixture is shown at 4, the exhaust port for the pressurized hot exhaust gases is indicated at 5 and the outlet opening for the re-expanded residual gases is shown at 6. All of these parts and openings being formed in the outer housing. Between each two successive figures in the group of Figures 1 to 48 there is a displacement angle of 30° in the counter-clockwise direction of the center $M_2$ of the rotor relative to the center $M_1$ of the shaft that carries the eccentric. Additionally, any radial line of the rotor as denoted diagrammatically by the dotted line in Figure 1 is displaced through an angle of 7½° between each two consecutive figures. In these figures the complete working cycle for one chamber $V_1$ will be described, it being understood that the same conditions occur in succession with respect to the remaining working chambers. In Figure 1 the rotor is shown in a position in which the volume of chamber $V_1$ is at its minimum and this position corresponds to the position known as top dead center in a reciprocating engine. The firing takes place, ignition occurs similarly as in reciprocating engines somewhat in advance of this position, the flash 7 denoting not only ignition but the approximate location of the spark plug. In the consecutive positions shown in Figures 2 to 7 the expansion or working cycle occurs in which the volume of chamber $V_1$ increases until at the position of Figure 8 the exhaust port 5 has been opened and the pressurized gases under high temperature start to leave through port 5 for introduction into an expansion machine of any suitable conventional construction. From the position of Figure 8 to a position somewhat between Figures 16 and 17 this exhaust port 5 is open. However, the outer periphery of the rotor is provided with cavities C so that prior to the rotor assuming a position where a line extending between adjacent apices is more or less perpendicular to a radial line passing through the center $M_1$ and the surface of the outer body at a point PMR that is at a minimum distance from this center the gases from chamber $V_1$ flow past such point PMR as shown in Figures 16 and 17. Thus, before the side face of the rotor has closed the exhaust port 5 some of the residual combustion gases start to pass from one lobe-defining portion to the next as regards the direction of turning of the rotor and therefore chamber $V_1$ has gone through the position where it has minimum volume and such residual gases start to expand as the volume of chamber $V_1$ expands in the successive positions from Figures 17 up to Figure 22. Approximately in the position shown in Figure 19, the entire volume of chamber $V_1$ is again comprised within a single lobe-defining portion since the trailing lip of the cavity C has moved past the inner surface of the housing at one of the points PMR at a minimum distance from the center or axis $M_1$. The volume of chamber $V_1$ continues to expand until just after the position of Figure 22 when the residual gas outlet duct 6 is exposed and these residual gases leave the engine. In the successive positions from Figure 23 on to Figure 33 the residual gases are discharged and the volume of chamber $V_1$ decreases until the position shown in Figure 33 is reached which corresponds to scavenging top dead center. Following the position of Figure 33 the inlet opening 4 is exposed and the intake cycle continues up to a position somewhat between the phase positions of Figure 43 and Figure 44 at which time the intake is closed and chamber $V_1$ undergoes compression through the successive positions up to Figure 48. Ignition occurs somewhat between the position shown in Figure 48 and the position shown in Figure 1. Thus the complete cycle is illustrated for one chamber in these figures.

In Figures 49 to 51 is illustrated a combined engine and compressor structure. The engine operates in accordance with the afore-described six cycles and the combination unit is axially compact, of economical construction and high efficiency.

The unit includes a stationary housing structure 1′ and the inner periphery of this housing has the shape shown in Figure 51 in which its inner surface is in the form of a 3-lobed or arched epitrochoid or of an outer curve parallel therewith. The housing includes axially spaced end wall means 1a and 1b and a peripheral shell or wall portion 1c that interconnects the end walls. The end wall portion 1b has an opening 4 from which extends the intake duct portion 5a to which a carburettor 51 is connected. The same end wall structure 1b has an opening therein centrally of its axis for receiving suitable bearing means such as ball bearings 90 for rotatably supporting a shaft 52. The opposite end wall 1a has an opening therein within which is mounted a gear structure 56 having external teeth 56'. Suitably journalled within this gear structure is another portion of shaft 52. The portion of the shaft that extends between the end wall means 1a, 1b, is formed as an eccentric 53 and a rotor 2' is journalled on this eccentric. The outer contour of the rotor corresponds approximately to the inner envelope of the epitrochoidal curve that generated the inner contour of the shell means 1c. In this connection for practical reasons the outer contour of the rotor 2' will always be defined by a curve somewhat less than the true or theoretical inner envelope. The rotor 2' has four apex portions within which are mounted edge sealing means shown diagrammatically at 3', Figure 51. These sealing means are the type disclosed in either of prior filed applications Ser. No. 654,840 or Ser. No. 761,339.

The shaft 52 turns at a speed higher than that of the rotor 2' and in this embodiment this speed ratio is 4 to 1. To permanently maintain the speed ratio an internally toothed ring gear 55 is formed as a part of or is fixed to one end face of the rotor 2'. This ring gear 55 is in mesh with the teeth 56' on the gear structure 56. The side wall means 1a further includes an outlet channel or duct 57 extending from an opening 6, Fig. 51, and through which re-expanded residual gases are exhausted. In addition this side wall means 1a has another opening 5 therein from which extends an exhaust duct 58 through which pressurized high temperature combustion gases are delivered. The side wall means 1a, 1b and the peripheral wall means or shell 1c are provided with channels or conduits shown at 59 through which is circulated a liquid cooling medium. As shown in the drawing these channels or conduits 59 are also disposed around the exhaust duct 58. Figure 51 illustrates the location of the various openings in the side walls. In that view, the rotor is shown in the phase position in which its end face covers the intake opening 4 while the outlet opening 5 for pressurized high temperature gases is partly exposed. As indicated previously, such gases are delivered to an expansion machine for further utilization.

In order to increase the output of gas that is to be utilized and to lower the temperature thereof this invention combines a compressor with the engine. The compressor of the compressor-engine combination of this invention includes a stationary inner arbor 60 that has an enlarged central portion and oppositely extending inlet and outlet ducts 68 and 69. These ducts are respectively securely mounted to the end wall portion of a housing component 63 and the side wall means 1b which has an opening 69a therein disposed approximately opposite the exhaust opening 5. Journalled about the enlarged portion of the arbor 60 is a rotor 61 and surrounding this rotor eccentrically thereof is an outer rotor 62. Both rotors turn in the same direction with rotor 62 turning at twice the speed of rotor 61. Gearing means 64 and 66 are splined to the left hand end portion of shaft 52 and in mesh with gears 65 and 67 respectively fast with the inner rotor and the outer rotor so that these rotors are driven by the engine. During operation air is drawn in through inlet duct 68 and passes through one of two channels 73 into the working chamber 74 which is one of two working chambers formed between the outer surface of rotor 61 and the inner surface 72 of rotor 62, Fig. 50. Thus the arbor 60 with its ducts 68 and 69 in conjunction with the channels 73 serves to control the compressor air flow. The contour of inner surface 72 is in the form of an epitrochoid while the outer contour of rotor 61 approximates the envelope generated by the relative movement of the outer rotor. Consequently on relative rotation of the rotors the variable volume working chambers 74 and 75 are formed and the air that enters these chambers is compressed and then delivered through whichever opening 73 is in communication with the inlet end of the outlet duct 69 for entry into the engine through opening 69a. This compressed air entering the working chamber of the engine not only functions as scavenging air but also cools the rotor of the engine, the surfaces of the housing and rotor that define a combustion chamber and the edges of the exhaust port so that the hot exhaust gases do not affect such edges. The invention, however, is not to be restricted to an arrangement in which the outlet from the compressor communicates with the working chamber of the engine at a point opposite the exhaust opening 5. For example, the outlet from the compressor can be placed in communication with the outlet from the engine at a location adjacent the exhaust opening 5 but outside of the engine so that the compressed air is mixed with the hot gases substantially immediately after they leave the working chambers and in this way the marginal edges of the exhaust opening 5 of the engine can be cooled. In the illustrated embodiment of the invention the volumetric capacity of the compressor is double the volumetric capacity of the engine so that the temperature of the exhaust gases leaving the engine for use in an expansion machine such as a turbine can be adequately lowered. At the right hand side of shaft 52 is splined a gear 76 meshing with a further gear 77 fast with an output shaft 78. This output shaft can be coupled through suitable gearing not shown with the turbine so that the complete power output of the engine can be utilized. In other words a portion of this power drives a compressor and the residual power can be added to the output shaft of the turbine by a suitable conventional gearing relationship.

As will be clear from the drawing this invention provides an axially compact rotary engine-rotary compressor combination or unit which is of light weight construction and high efficiency. Only a minimum number of mounting components for supporting the several rotating parts of the unit are necessary. Thus, the stationary common housing structure includes one end shell portion 63 the end wall of which supports the arbor 60 and also supports bearings for the outer rotor 62 of the compressor. A web portion 91 is bolted to a shoulder formed on the interior of the shell 63 for rotatably supporting the hub of the outer rotor. The hub of the inner rotor is journalled on the outlet channel 69 by suitable bearings such as the sleeve bearing or bushing shown in the drawing. Between the gears 64 and the bearings 90 a counter-weight is splined to the left hand portion of shaft 52. A similar counter-weight being splined to the right hand portion of shaft 52 between the exterior of end wall 1a and the interior of a housing wall portion 92. A housing cap 93 is mounted over the outer right hand end of shaft 52, the gears 76, 77 and the output shaft 78. This output shaft is supported by suitable bearings such as the ball bearings shown in the drawing that are mounted within flanges or hubs formed on the housing components 92 and 93, respectively.

Figure 52:
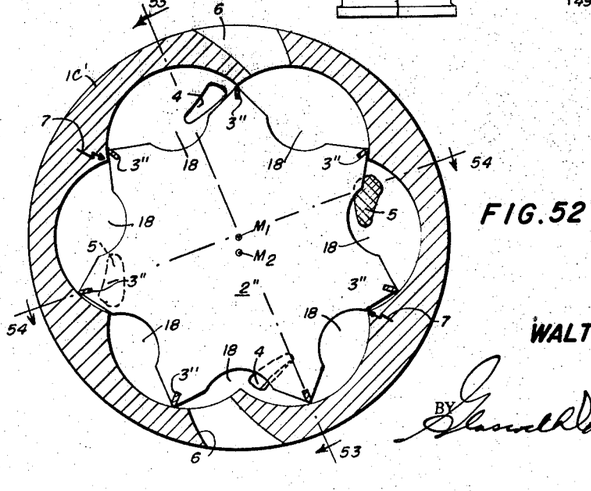
Figure 52 is a view partly in longitudinal section and partly in elevation diagrammatically illustrating an engine of modified form in which the inner contour of the outer body is in the shape of a 6-lobed or arched epitrochoid while the outer contour of the inner body is shaped to include seven apex portions, this view illustrating only a portion of the structure shown in Figure 53 and with the outer housing removed.
Figure 53:
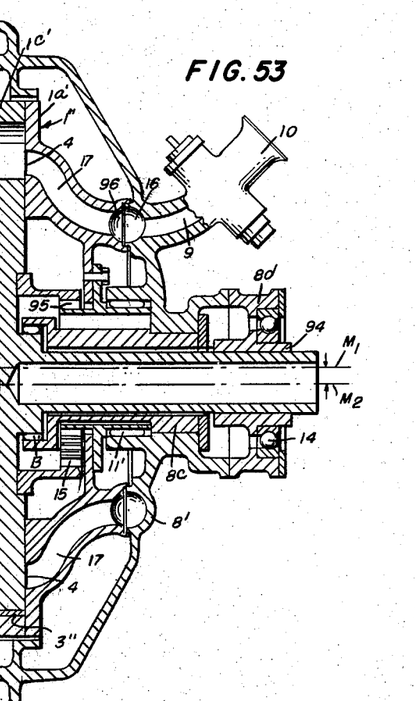
Figure 53 is a view in longitudinal section along line 53—53 of Figure 52.
Figure 54:
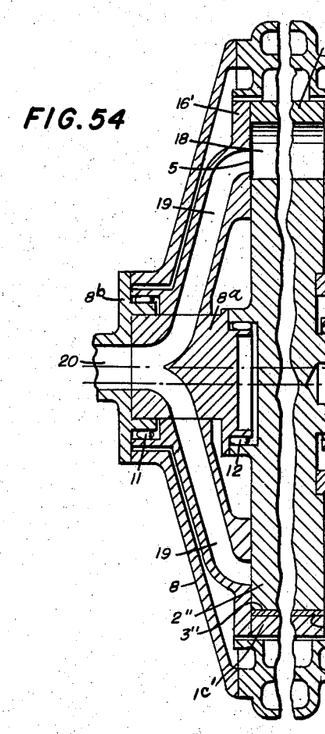
Figure 54 is a similar view taken along line 54—54 of Figure 52.

The structure of the heat generator of this invention is not to be limited to the particular shape shown in Figures 49 and 51. Accordingly Figures 52 to 54 illustrate a modified rotary engine which functions as a heat generator. In this form of the invention the shaped bodies that, upon relative rotation define a plurality of variable volume working chambers are both rotors. Accordingly, there is a stationary housing structure including two end wall portions 8 and 8', portion 8' having an opening therein within which is fixed a stepped sleeve 8c that carries bearings 13 that journal one hub of the inner rotor 2". The opposite hub of the inner rotor is journalled on bearings 12 mounted on a stationary body 8a that is mounted within a flange formed on an end cap structure 8b that is securely fastened to the casing part 8. One end of the outer rotor is journalled on bearings 11 mounted on the flange of cap 8b while the other end of the outer rotor is journalled on bearings 11' mounted on a flange of casing part 8'. The casing also includes an annular component 8d that supports the outer race of a bearing means 14 that also journals the shaft of the inner rotor. The sleeve 94 is securely fastened to this shaft. The inner rotor also includes an internally toothed gear 15 that meshes with an externally toothed gear 95 fast with the outer rotor 1".

As shown in Figure 52 the engine of this form of the invention has the inner contour of the peripheral wall 1c' shaped as a 6-lobed epitrochoid. The outer contour of the inner rotor 2" approximates the inner envelope of such epitrochoid and thus has seven apex portions. Suitable seal means of the type referred to in said prior filed applications are at these apex portions 3", and end face seal means carried by the inner rotor are utilized although they have not been illustrated in the drawings since these are diagrammatic figures. Upon relative rotation of the rotors which is at a fixed speed ratio of 7:6 with the outer rotor turning at a higher speed, seven variable volume working chambers 18 are formed. The side wall portion 1a' is provided with two inlet openings 4 that are diametrically opposite one another. The side wall portion 1b' is provided with two exhaust gas openings 5 at diametrically opposite positions while the peripheral wall portion 1c is provided with residual gas outlet openings 6 at diametrically opposite location. Further spark plugs indicated diagrammatically at 7 are carried by the outer rotor and are located at diametrically opposite positions. The inner rotor is mounted about an axis $M_2$ that is eccentric to axis $M_1$ of the outer rotor by the distance $e$. A carburettor 10 is connected to an inlet duct 9 extending from end wall forming portion 8'. This duct 9 communicates with an annular channel 16 formed on the interior of wall portion 8'. This channel is completed by an annular channel 96 formed on the right hand end wall portion 1a' of the outer rotor. Between the inlet openings 4 and this annular channel 96 there extend ducts 17 so that upon the relative rotation of the inner rotor with respect to the outer rotor the fuel-air mixture enters two working chambers simultaneously. A pressurized hot gas duct 20 communicates with a bifurcated passage in housing component 8a. Conduit or duct portions 19 formed in the outer rotor communicates with the exhaust openings 5 and such bifurcated passage respectively.

If desired the engine shown in Figures 52 to 54 can be combined with a compressor of the type shown in Figure 49 or any other suitable type.

What is claimed is:

1. In a rotary mechanism, an outer body having axially spaced end walls and a peripheral wall interconnecting the end walls, an inner body within the outer body and having axially spaced end faces and a peripheral outer surface, means supporting said inner body for turning movement relative to the outer body about an axis that is eccentrically disposed with respect to the geometrical center of the inner surface of the peripheral wall of the outer body, the inner surface of said peripheral wall and said peripheral outer surface being co-operatively shaped so as to define upon relative turning movement of the inner body with respect to the outer body at least four variable volume working chambers, at least one fuel admission channel means associated with the outer body and having a fuel delivery opening communicating with the space between the bodies, means for feeding fuel to said channel means, at least one exhaust gas delivery means communicating with the space between the bodies at a location circumferentially spaced from said delivery opening, and at least one residual exhaust gas delivery means communicating with the space between the bodies at a location circumferentially spaced from said first gas delivery means and between said first gas delivery means and said fuel delivery opening such that upon relative turning movement of the inner body with respect to the outer body each working chamber undergoes a cycle of operation determined solely by the phase positions of the inner body relative to the outer body and consisting of a fuel admission phase, a compression phase, an expansion and working phase, an exhaust gas delivery phase for delivery of hot pressurized gases, a re-expansion phase during which residual gases remaining within the working chamber are expanded and have their temperature reduced and finally an exhaust phase for discharging such residual gases from the space between the bodies.

2. In a rotary mechanism, an outer body having axially spaced end walls and a peripheral wall interconnecting the end walls, an inner body within the outer body and having axially spaced end faces and a peripheral outer surface, means supporting said inner body for turning movement relative to the outer body about an axis that is eccentrically disposed with respect to the geometrical center of the inner surface of the peripheral wall of the outer body, the inner surface of said peripheral wall and said peripheral outer surface being co-operatively shaped so as to define upon relative turning movement of the inner body with respect to the outer body at least four variable volume working chambers, and including a plurality of symmetrically arranged circumferentially spaced lobe-defining portions on the inner surface of the peripheral wall and a plurality of symmetrically arranged circumferentially spaced apex portions on the peripheral outer surface of the inner body, there being at least four apex portions, means mechanically interconnecting the bodies so that the inner body turns relative to the outer body in a manner determined by the number of apex portions relative to the number of lobe-defining portions, at least one fuel admission channel means associated with the outer body and having a fuel delivery opening communicating with the space between the bodies, means for feeding fuel to said channel means, at least one exhaust gas delivery means communicating with the space between the bodies at a location circumferentially spaced from said delivery opening, and at least one residual exhaust gas delivery means communicating with the space between the bodies at a location circumferentially spaced from said first gas delivery means and between said first gas delivery means and said fuel delivery opening such that upon relative turning movement of the inner body with respect to the outer body each working chamber undergoes a cycle of operation determined solely by the phase positions of the inner body relative to the outer body and consisting of a fuel admission phase, a compression phase, an expansion and working phase, an exhaust gas delivery phase for delivery of hot pressurized gases, a re-expansion phase during which residual gases remaining within the working chamber are expanded and have their temperature reduced and finally an exhaust phase for discharging such residual gases from the space between the bodies.

3. A rotary mechanism as claimed in claim 2 in which the inner surface of said peripheral wall is shaped to define a 3-lobed epitrochoid, and the peripheral outer surface of said inner body is shaped to approximate the inner envelope of such epitrochoid and includes four symmetrically arranged, circumferentially spaced apex means making continuous sealing contact with the inner surface of said peripheral wall.

4. A rotary mechanism as claimed in claim 2 in which the inner surface of said peripheral wall is shaped to define a 6-lobed epitrochoid, and the peripheral outer surface of said inner body is shaped to approximate the inner envelop of such epitrochoid and includes seven symmetrically arranged, circumferentially spaced apex means making continuous sealing contact with the inner surface of said peripheral wall.

5. A rotary mechanism as claimed in claim 2 in which both bodies are rotors.

6. A rotary mechanism as claimed in claim 2 in which said outer body is stationary and which includes an eccentric rotatably mounted within said outer body, a shaft carrying such eccentric and having its axis coinciding with the geometrical center of said outer body, said inner body comprising a rotor journalled on said eccentric whereby during operation the inner body performs a planetary movement relative to the outer body with the apex portions of the inner body maintaining continuous sealing contact with the inner surface of the peripheral wall of the outer body.

7. A rotary mechanism as claimed in claim 1 and further including an air compressor means, means coupling such compressor means to be driven by said mechanism, said compressor means including a compressed air delivery means and said compressed air delivery means being constructed and arranged to discharge compressed air into the hot exhaust gases.

8. A rotary mechanism as claimed in claim 1 and further including an air compressor means, means coupling such compressor means to be driven by said mechanism, said compressor means including a compressed air delivery means and said compressed air delivery means being constructed and arranged to discharge compressed air into the hot exhaust gases adjacent said first exhaust gas delivery means.

9. A rotary mechanism as claimed in claim 1 and further including an air compressor means, means coupling such compressor means to be driven by said mechanism, said compressor means including a compressed air delivery means and said compressed air delivery means being constructed and arranged to discharge compressed air into the hot exhaust gases within the working chambers.

10. A rotary mechanism as claimed in claim 1 and further including a rotary compressor means operatively coupled to said mechanism so as to be driven thereby and said compressor means including a compressed air delivery means constructed and arranged to mix such compressed air with the exhaust gases existing in the engine following the working phase.

11. A rotary mechanism as claimed in claim 1 in which said rotary compressor includes an outer body and an inner body, said inner body being within the outer body and the internal contour of the outer body being trochoidal in shape while the external contour of the inner body approximates the inner envelope generated by such trochoidal shape.

12. A rotary mechanism as claimed in claim 2 and further including a rotary compressor means, said compressor means including a stationary air flow controlling body having an air inlet opening communicating with the atmosphere and a compressed air delivery channel means, a rotor journalled for rotation about said body and having an external configuration including a plurality of apex portions, such apex portions being at least two in number, symmetrically arranged and circumferentially spaced, another rotor supported for rotation about said first rotor around an axis eccentric of and parallel with the axis of said first rotor, said second-mentioned rotor having an epitrochoidal internal periphery, said outer body of the rotary mechanism being stationary, the inner surface of the peripheral wall of the outer body including three lobe-defining portions, a shaft supported for rotation about an axis that coincides with the geometrical center of such outer body, an eccentric carried by said shaft and disposed between the end walls of the outer body, a rotor journalled on such eccentric, said rotor comprising said first-mentioned inner body and the peripheral outer surface of the rotor including four apex portions, a mechanical interconnection between said bodies comprising an internally toothed gear fixed to the rotor and an externally toothed gear carried by said outer body, said gears being intermeshing and the ratio of the teeth thereof being 4:3 a gear means carried by each rotor of said compressor, additional gear means carried by said shaft and in meshing engagement with the gear means for each rotor of the compressor so that the phase position of the rotors of the compressor when compressed air is being delivered from the compressor coincides with the phase position of the bodies of the rotary mechanism in which the hot exhaust gas delivery means commences to open whereby compressed air is delivered by the compressor simultaneously with discharge of hot pressurized gases from the rotary mechanism and said compressed air delivery channel means of the compressor being constructed and arranged to mix the compressed air with such hot gases.

No references cited.